July 10, 1934.  H. MILLER  1,966,209
VALVE OPERATING MECHANISM
Filed Nov. 25, 1931  2 Sheets-Sheet 2
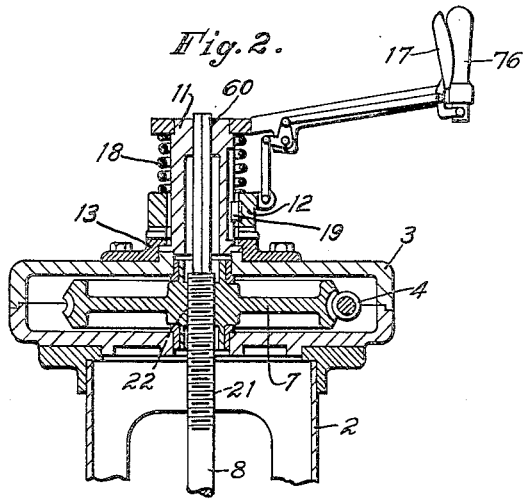
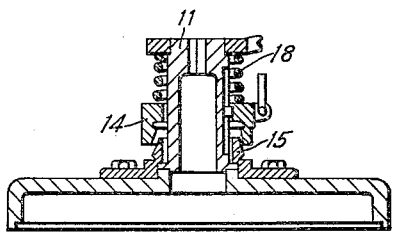
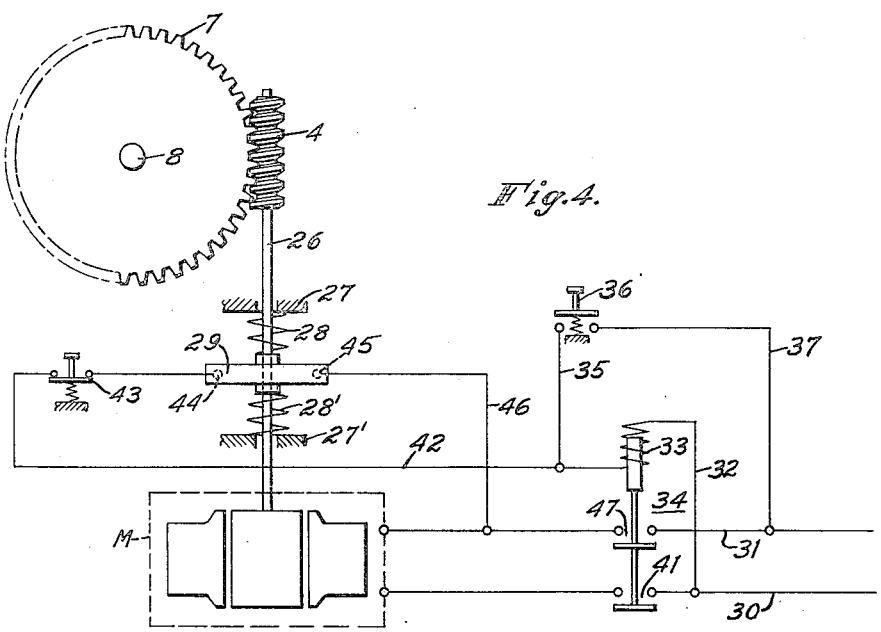
WITNESSES:
R. S. Williams
Paul E. Friedemann
INVENTOR
Hans Miller
BY
W. R. Coley
ATTORNEY Patented July 10, 1934

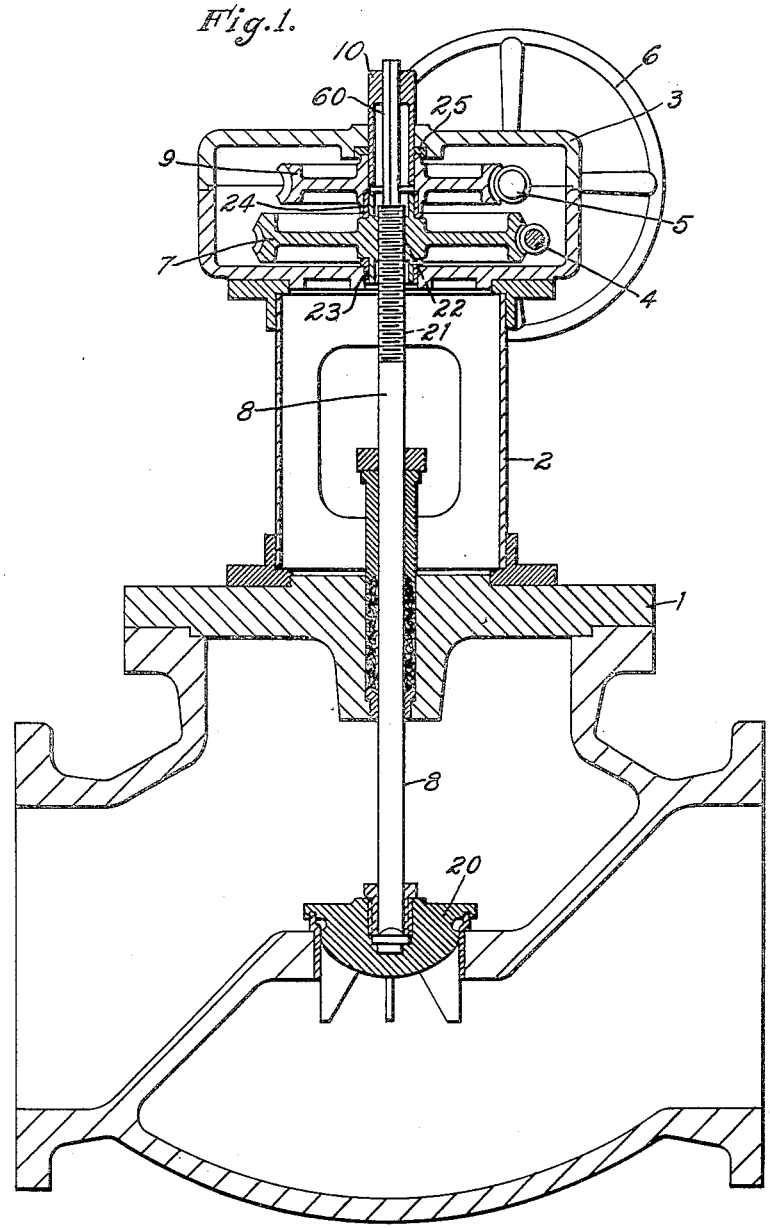

1,966,209

UNITED STATES PATENT OFFICE 1,966,209

VALVE OPERATING MECHANISM

Hans Miller, Berlin-Lichterfelde, Germany, assignor to Westinghouse Electric & Manufacturing Company, a corporation of Pennsylvania Application November 25, 1931, Serial No. 577,215
In Germany November 27, 1930

6 Claims. (Cl. 137—139)

This invention relates to improvements in the means for operating valves for oil pipes, steam, water or other distributing means and to an improved method of operating such valves.

More particularly, this invention relates to regulating apparatus by means of which the valve may be selectively operated either by hand or by an electric motor.

Devices are known, in which valves are operated by an electric motor and special hand wheels are provided to enable an additional adjustment to be made, or for maintaining operation in case of a disturbance in the supply of electricity. The devices are so constructed that the operation of the valve, when effected by the hand wheel, does not rotate the motor shaft, and when the operation of the valve is effected by the motor, the hand wheel is not caused to rotate. To accomplish the results stated, an expensive and cumbersome irreversible worm gear and planetary differential reduction gear assembly was utilized.

It is one of the objects of this invention to provide a simple and inexpensive transmission system for selectively or, if desired, simultaneously operating a valve through manual means, or power means.

Other objects and advantages of this invention will become apparent from a study of the following detailed description, when considered in conjunction with the accompanying drawings, in which:

Figure 1 shows a longitudinal section of the valve and the power transmission assembly;

Fig. 2 shows a longitudinal section of a modified transmission assembly;

Fig. 3 shows, in section, a clutch arrangement such as may be used with the modification shown in Fig. 2; and Fig. 4 is a diagrammatic showing of the circuit arrangement for stopping the motor when the valve is either completely closed or completely open.

Referring more particularly to Fig. 1 of the drawings, 1 designates the valve assembly showing the valve 20 mounted on the lower portion of the stem 8. The stem 8 is mounted in suitable bearings in the valve assembly and the transmission housing 3 is supported by bracket 2 on the valve assembly 1.

A part of the upper portion of the stem 8 is provided with an externally-threaded portion 21 which cooperates with an internally-threaded portion 22 of the worm wheel 7. A sleeve 10, having a rectangular opening for receiving the rectangular portion 60 of the upper end of the stem 8, is rotatably mounted in the transmission casing 3, and is keyed to the worm wheel 9. It is, of course, understood that worm wheel 9 may have a sleeve-like hub or be designed as a sleeve gear thus dispensing with the separate sleeve 10. The worm wheel 9 and the worm wheel 7 are mounted for rotation in the transmission casing 3 within the bearings 23, 24 and 25. The worm wheel 9 is disposed to cooperate with the worm 5, actuated by the hand wheel 6, whereas the worm wheel 7 is disposed to be actuated by the worm 4, driven by the motor M (see Fig. 4).

The operation of this valve proceeds as follows: If it is desired to actuate the valve 20 by the hand wheel, the worm 5 drives the worm wheel 9 and, since the sleeve 10 cooperatively engages the rectangular portion 60 of the stem 8, the stem 8 is rotated. It is a well known fact that a worm and worm wheel represent an irreversible mechanism. That being the case, rotation of the stem 8 will cause the stem to be raised or lowered, depending upon the direction of rotation of the hand wheel 6, this raising or lowering operation taking place by the cooperative action of the threads 21 and 22, because the gear wheel 7 is held in fixed position by the worm 4.

If the motor M drives the worm 4, the threads 21 and 22 again cooperated to either raise or lower the valve 20 by reason of the fact that the sleeve 10 is held in fixed position by the worm 5 and worm wheel 9. The stem 8, therefore, moves in a vertical direction sliding in the sleeve 10.

Fig. 2 shows a modification of the valve operating means wherein the hand wheel and worm wheel are replaced by a latching mechanism, as shown. The lever 76 is rigidly connected to the sleeve 11 and, by means of the lever arrangement 17, the sleeve 11 may be fixed on the transmission casing 3 in any desired position by the cooperative action of the teeth on the sleeve 12 and bracket member 13, respectively.

To assure that the members 12 and 13 are brought in cooperative relation and also rigidly secure the sleeve 11 to the housing 3, a spring 18 is interposed between the member 12 and an annular connection between the sleeve 11 and lever 76. Furthermore, a key-and-slot arrangement 19 is utilized to prevent the sleeve 11 from rotating when the jaws on the sleeve member 12 and bracket member 13 are in engagement.

When it is desired to actuate the valve 20 by the lever 76, the member 17 is actuated, thereby releasing the sleeve member 12 and bracket member 13. Rotation of the stem 8, therefore, causes a vertical movement of the stem by the cooperative action of the threads 21 and 22, as heretofore explained in connection with the discussion of the operation of the modification shown in Fig. 1.

The members 13 and 12 need not necessarily be provided with cooperating teeth, but may be provided with clutch members 14 and 15, as shown in Fig. 3. In some installations, this arrangement may be preferable.

In some installations, it may be very desirable that the motor operating the worm 4, and in consequence the worm wheel 7, be stopped when the valve 20 has been moved to its extreme open position or else has been moved to a seating position on the valve seat. In such cases, it may be desirable to provide the worm 4 with a limit-switch arrangement, whereby the motor may be stopped when the worm wheel has a tendency to move longitudinal its axis more readily than rotate the worm wheel 7. Fig. 4 shows, in a diagrammatic manner, how this desirable result may be accomplished. The novel results obtained by the modification shown in Fig. 4 can probably be best understood by a study of the sequence of operations.

Assuming that conductors 30 and 31 are energized from a suitable source of electrical energy, and it is desired to actuate the valve 20, the attendant actuates the starting switch 36, whereby a circuit is established from the energizing conductor 30 through conductor 32, actuating coil 33 of the line contactor 34, conductor 35, starting switch 36 and conductor 37 to the energized conductor 31. Since the motor is at rest, no longitudinal thrust will be exerted upon the worm 4 and, in consequence, the contact fingers 44 and 45 will be bridged by the contact member 29, as shown.

After the operation of the line contactor 34, the starting switch 36 may be released, but the actuating coil 33 of the line contactor will be energized by a circuit extending from the energized conductor 30 through conductor 32, actuating coil 33, conductor 42, stopping switch 43, contact fingers 44 and 45, bridged by the contact segment 29, conductor 46, contact members 47, to the energized conductor 31. The motor M is also energized by the operaton of the line contactor 34, since contact members 41 and 47 are closed.

The contact segment 29 is biased to the position shown by springs 28 and 28', interposed between the supports 27 and 27', respectively. The springs 28 and 28' are not depressed any considerable extent until some selected predetermined longitudinal thrust is exerted on the worm 4 by reason of the locking of the worm wheel 7, when the valve 20 has been moved to its seated position or to its extreme open position. When the valve has become seated or is completely opened, the worm wheel 7 becomes fixed and the worm 4, actuating as a screw, moves the contact segment 29 to interrupt the circuit for the actuating coil 33 at the contact fingers 44 and 45. The line contactor 34, therefore, moves to open circuit position and the motor stops. The motor cannot restart, even though the contact segment 29 should return to the position shown, since the circut for the actuating coil 33 for normal operation is through the contact members 47 which are open after the actuating coil 33 has become deenergized.

It is, therefore, apparent that the modification shown in Fig. 4 provides means for automatically stopping the motor when the valve has moved to its extreme position. Any other means than the specific arrangement shown may, of course, be utilized without departing from the spirit of the invention.

Although I have shown and described certain specific embodiments of my invention, I am fully aware that many modifications thereof are possible. My inventon, therefore, is not to be restricted, except insofar as is necessitated by the prior art and by the scope of the appended claims.

I claim as my invention:

1. A valve operating mechanism adapted to operate the valve through manually operable or motor operable means, a motor, a worm driven by the motor, an internally threaded worm wheel driven by the worm, an externally threaded valve stem cooperatively engaging the internal threads of said worm wheel, a sleeve member rotatable with said stem but slidably mounted thereon, a worm wheel rigidly secured to the sleeve and a manually operable worm for operating said worm wheel.

2. A transmission mechanism for a valve, a valve stem having a threaded portion and a non-circular portion, a threaded member mounted on the threaded stem portion, an irreversible mechanism for driving the threaded member, a motor for actuating said irreversible mechanism, a sleeve gear fitting said non-circular portion slidably mounted thereon, and a manually operable irreversible mechanism for operating the sleeve gear.

3. A transmission mechanism for a valve, a valve and valve stem therefor, an irreversible mechanism directly coupled to reciprocate the stem, a motor for operating the mechanism, a second irreverisble mechanism directly coupled to the stem and cooperating with said first named irreversible mechanism to rotate and reciprocate the stem and manually operable means for operating said second irreversible mechanism.

4. A transmission mechanism for a valve, a valve and stem therefor, an irreversible mechaism drectly coupled to reciprocate the stem, a motor for operating the mechanism, a second irreversible mechanism directly coupled to the stem and cooperating with said first named irreversible mechanism to rotate and reciprocate the stem, manually operable means for operating said second irreversible mechansm, and means responsive to the operating conditions of said first named irreversible mechanism for controlling the operation of said motor.

5. In a valve operating mechanism, a valve, a stem therefor having a threaded portion, a power transmission housing, an internally threaded worm wheel mounted for rotation in the housing and threadedly engaging the threaded portion of the stem, a worm engaging the worm wheel, a motor for driving the worm whereby the valve and stem may be reciprocated, a hand-wheel, a worm operable by the hand wheel, a worm wheel driven by said worm, a sleeve secured to said second named worm wheel, said sleeve being adapted to slidably engage the stem but secured to prevent rotation of the stem with reference to the sleeve.

6. In a valve operating mechanism, a valve, a stem therefor having a threaded portion, a power transmission housing, an internally threaded worm wheel mounted for rotation in the housing and threadedly engaging the threaded portion of the stem, a worm engaging the worm wheel, a motor for driving the worm whereby the valve and stem may be reciprocated, a hand-wheel, a worm operable by the hand wheel, a worm wheel driven by said worm, a sleeve secured to said second named worm wheel, said sleeve being adapted to slidably engage the stem but secured to prevent rotation of the stem with reference to the sleeve, and means responsve to the operating characteristics of the worm driven by the motor for controlling the operation of the motor.

HANS MILLER.